Figure 1:
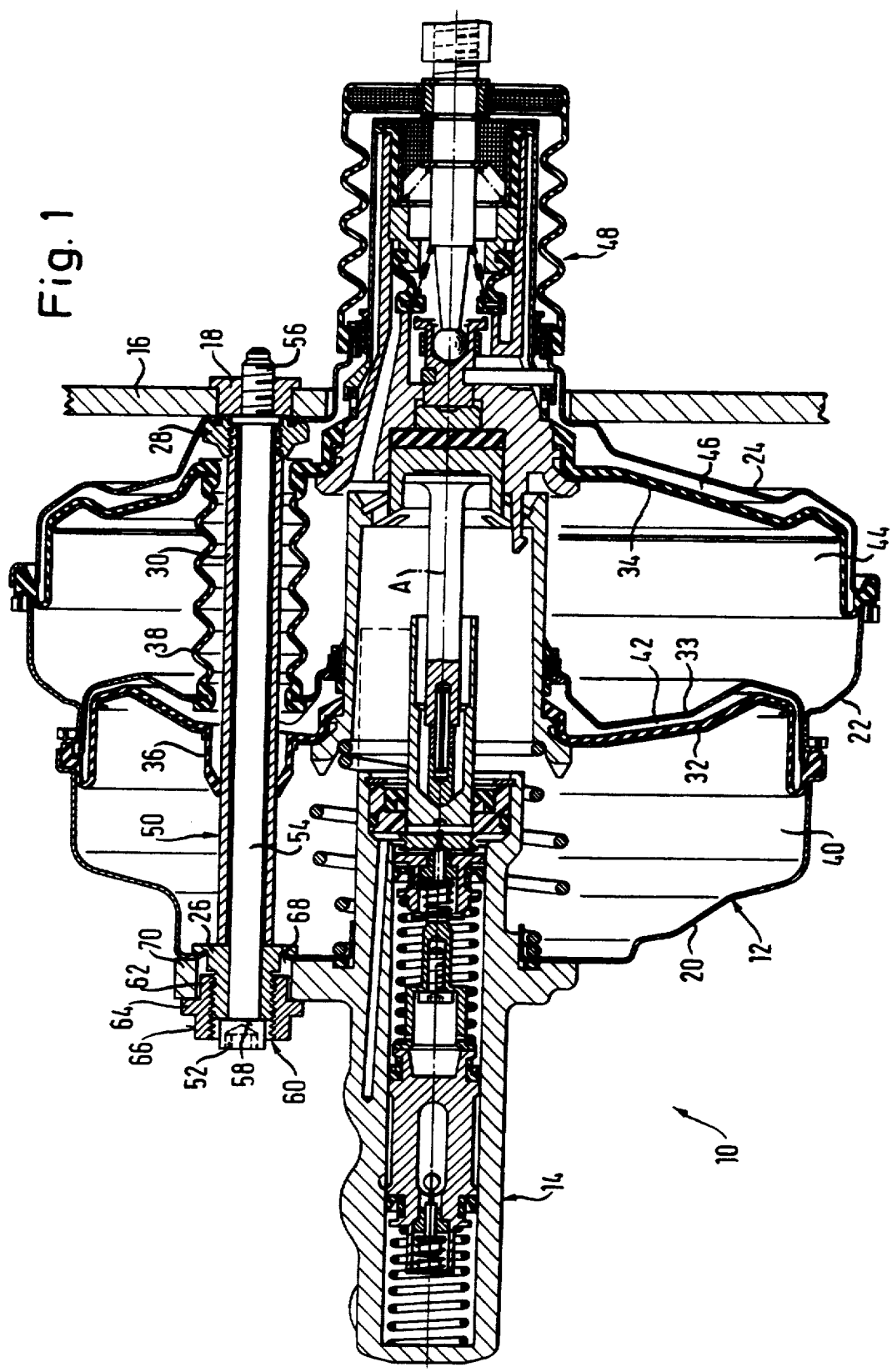

United States Patent [19]

Schlüter

[11] Patent Number: 5,410,880
[45] Date of Patent: May 2, 1995

[54] ACTUATOR UNIT FOR MOTOR VEHICLE BRAKES

[75] Inventor: Peter Schlüter, Kammerforst, Germany

[73] Assignee: Lucas Industries public limited company, Birmingham, England

[21] Appl. No.: 211,423
[22] PCT Filed: Jan. 22, 1993
[86] PCT No.: PCT/EP93/00143
  § 371 Date: Apr. 7, 1994
  § 102(e) Date: Apr. 7, 1994
[87] PCT Pub. No.: WO93/14964
  PCT Pub. Date: Aug. 5, 1993

[30] Foreign Application Priority Data

Jan. 31, 1992 [DE] Germany .......... 42 02 820.5

[51] Int. Cl.⁶ .......... B60T 13/563; F01B 11/02
[52] U.S. Cl. .......... 60/547.1; 92/128; 92/169.3
[58] Field of Search .......... 60/547.1, 552, 554; 92/128, 152, 161, 169.2, 169.3

[56] References Cited

U.S. PATENT DOCUMENTS

| | | | |
|---|---|---|---|
| 4,291,534 | 9/1981 | Jones | 60/547.1 |
| 4,594,854 | 6/1986 | Takeuchi et al. | 92/128 X |
| 4,608,826 | 9/1986 | Sawyer | 60/547.1 |
| 4,632,014 | 12/1986 | Endo | 60/547.1 X |
| 4,827,720 | 5/1989 | Flynn et al. | 60/547.1 |
| 5,072,996 | 12/1991 | Heibel et al. | 60/547.1 X |
| 5,079,914 | 1/1992 | Schluter . | |

FOREIGN PATENT DOCUMENTS

| | | | |
|---|---|---|---|
| 0058548 | 4/1982 | Japan | 92/169.3 |
| 0004663 | 1/1983 | Japan | 92/169.3 |

*Primary Examiner*—John E. Ryznic
*Attorney, Agent, or Firm*—Oblon, Spivak, McClelland, Maier & Neustadt

[57] ABSTRACT

A front housing part (20) of a brake pressure booster (12) carries two hollow inner threaded members (26) which each engage in a hole (68) formed in a flange (70) of a master cylinder (14) and each support the head (52) of a bolt (50). Each one of the bolts (50) extends through the associated inner threaded member (26) and through the booster (12) and has a threaded portion (56) which projects rearwardly out of the booster to be screwed into a threaded sleeve (18) at a dividing wall (16) of a motor vehicle. The flange (70) of the master cylinder (14) is clamped between the inner threaded members (26) and outer threaded members (60) which likewise are hollow and have inner diameters greater than the head (52) of the corresponding bolt (50). The outer threaded members (60) each include a sleeve-like extension (62) engaging in the corresponding hole (68) of the flange (70) and being screw connected to the inner threaded member (26) received in said hole.

8 Claims, 3 Drawing Sheets

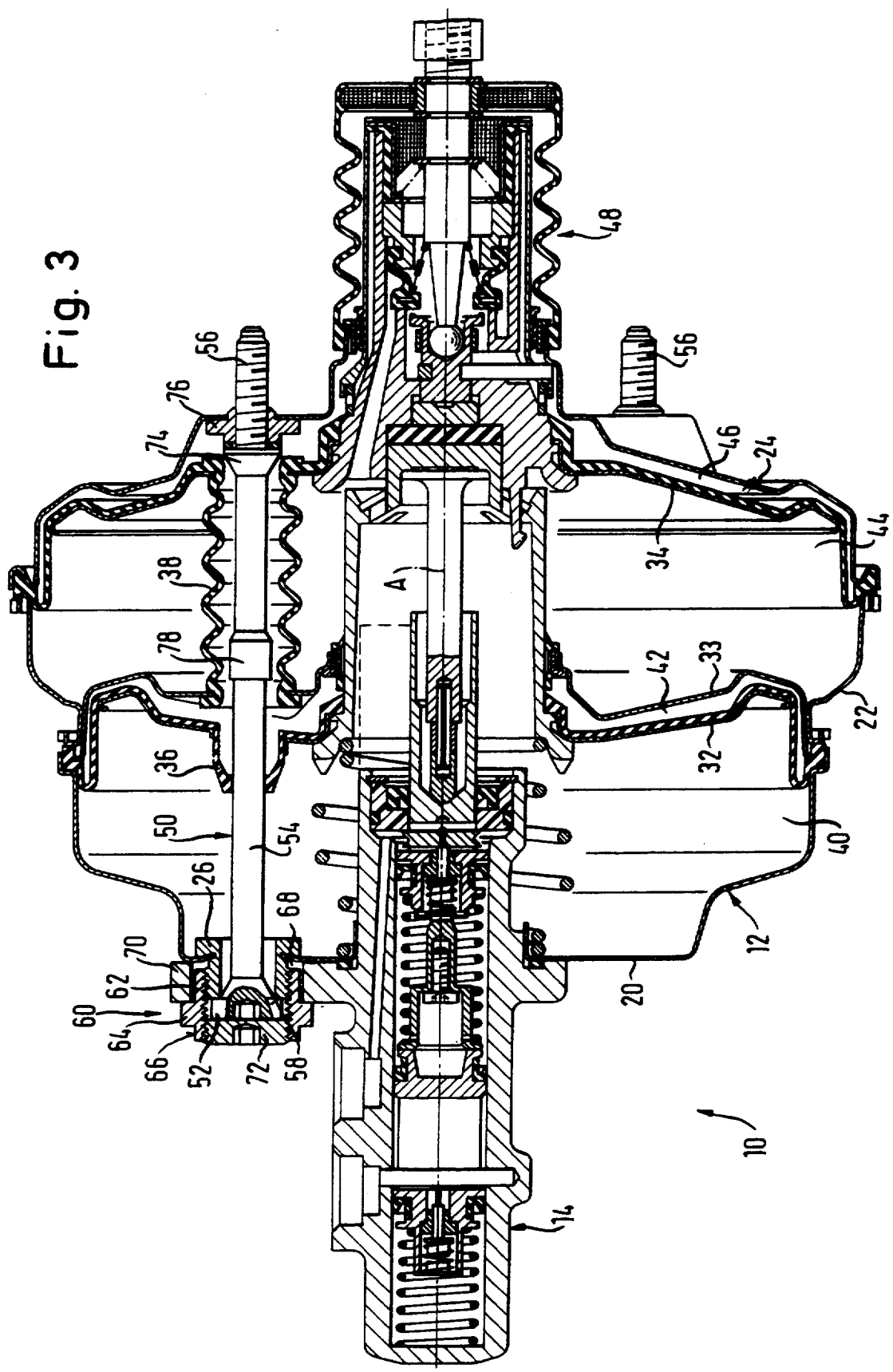

ACTUATOR UNIT FOR MOTOR VEHICLE BRAKES

The invention relates to an actuator unit for motor vehicle brakes, comprising a brake pressure booster which comprises front and rear housing parts and includes at least one movable partition at which differential pressure can be generated, a master cylinder which includes a flange fastened to the front housing part and having at least one through hole, and at least one bolt which comprises a shaft extending through the hole in the flange and through the two housing parts as well as the movable partition of the booster, a head disposed in front of the front housing part, and a threaded portion projecting out of the rear housing part and adapted to be screwed into a stationary thread presented in a dividing wall of a motor vehicle.

Such an actuator unit is known from EP 0 119 880 A1. Two bolts have their shafts extending through a hole each in a flange of the master cylinder and through one each of two tubes which are disposed within the brake pressure booster in parallel with the axis thereof and which are fixed to the rear housing part and guided for axial displacement at the front housing part. By means of these bolts, the master cylinder together with the booster can be fastened from the engine compartment of a motor vehicle to the dashboard thereof at which nuts are mounted for this purpose. This means that no manipulations to fix the master cylinder and the booster need be done in the passenger compartment. Where the master cylinder and booster are held together in this manner and both attached to the dashboard, it is not possible to separate the master cylinder from the booster without first disassembling the latter from the dashboard. Another actuator unit for motor vehicle brakes with which a master cylinder and a brake pressure booster are to be fastened jointly to the dashboard of a motor vehicle by means of a pair of threaded bolts is known from DE 28 30 262 C2. The threaded bolts extend paraxially through the booster and each include front and rear threaded portions which can be passed through the dashboard and secured by a nut each from the passenger compartment. Apart from manipulations from the engine compartment to secure the booster at the dashboard of a motor vehicle, further manipulations thus are required which can be accomplished only in the passenger compartment. Two hollow bolts are fastened to the front housing part of the booster, each extending through a hole in a flange of the master cylinder. The threaded bolts pass through one each of these hollow bolts. A small nut is screwed onto the front threaded portion of each threaded bolt so as to press against the front face of the corresponding hollow bolt. A larger nut each is screwed onto the two hollow bolts to press from the front against the flange of the master cylinder. The inner diameter of the larger nuts is greater than the greatest outer diameter of the small nuts. Consequently the master cylinder can be disassembled from the booster without removing the booster from the dashboard. That is done by unscrewing the larger nuts from the hollow bolts and withdrawing them to the front while passing them over the small nuts. Subsequently, also the flange of the master cylinder can be pulled off over the small nuts without loosening the latter. The structural length in axial direction of this known arrangement for fastening the brake pressure booster and the master cylinder is quite considerable and, therefore, it is difficult to find room for it when a brake fluid reservoir and the like are attached in the usual manner to the master cylinder. It is the object of the invention to improve an actuator unit for motor vehicle brakes, composed substantially of a brake pressure booster and a master cylinder, in such a way that space saving fastening elements are sufficient to hold the master cylinder and booster together, to fasten the unit as a whole to a dividing wall, especially the dashboard of a motor vehicle, from the engine compartment of the same without any manipulations from the passenger compartment, and furthermore to permit subsequent replacement of the master cylinder without having to disassemble the booster from the dividing wall of the motor vehicle.

The object is met, in accordance with the invention, by the features of claim 1. Advantageous further developments of the invention are presented in the subclaims.

Figure 2:
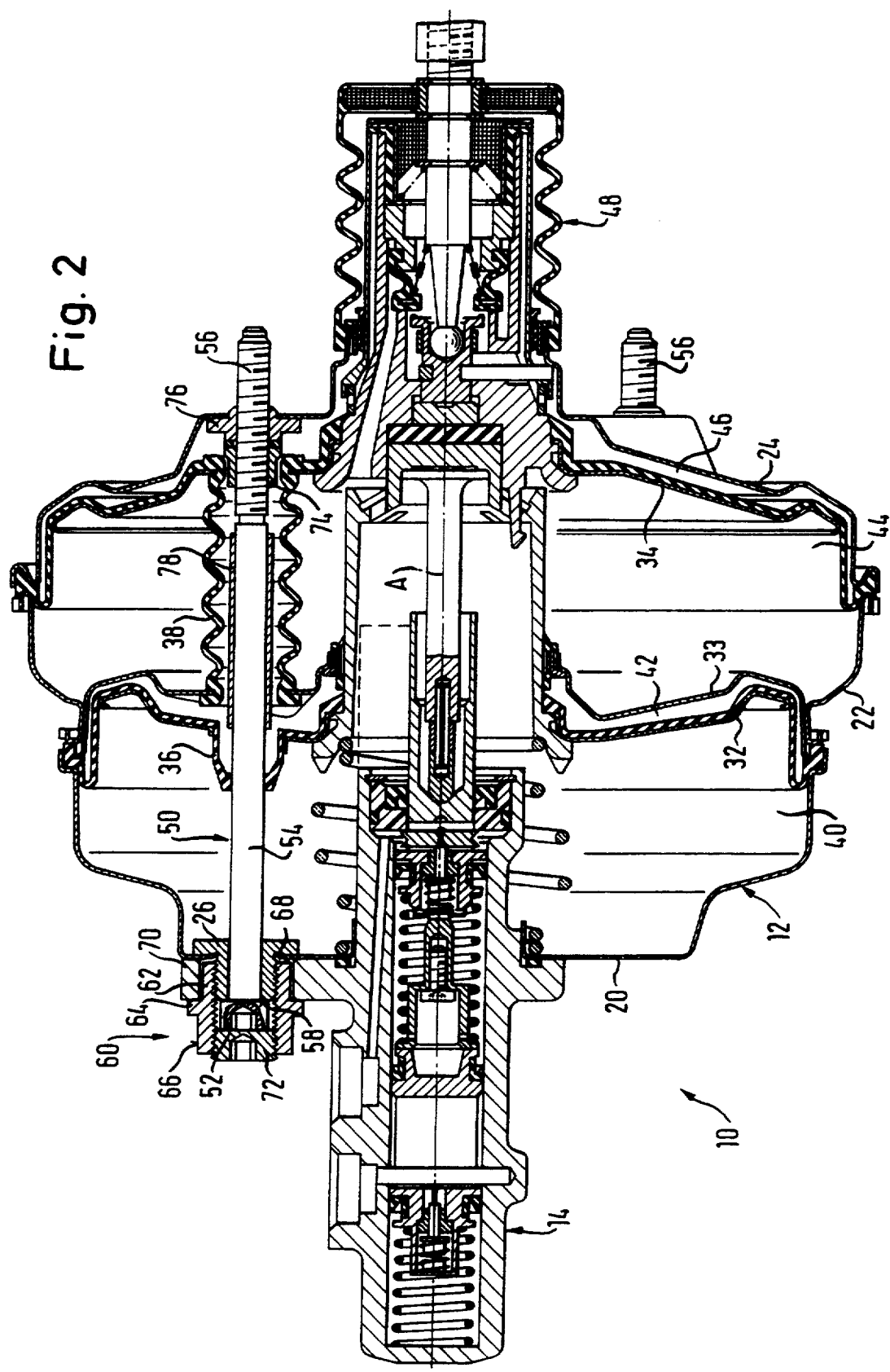

Embodiments of the invention will be described in greater detail below with reference to diagrammatic drawings, in which:

FIGS. 1 to 3 illustrate three embodiments of actuator units according to the invention for motor vehicle brakes, each in axial longitudinal section.

The actuator unit 10 shown in FIG. 1 essentially consists of a pneumatic brake pressure booster 12 in conventional tandem arrangement with an hydraulic master cylinder 14 likewise of conventional structure for a dual circuit brake system. The booster 12 and master cylinder 14 are aligned along an axis A and designed such that the actuator unit 10 as a whole can be mounted on a dividing wall 16, especially the dashboard of a motor vehicle, the wall being provided for this purpose with threaded sleeves 18 or the like.

The brake pressure booster 12 comprises front, central, and rear housing parts 20, 22, and 24, respectively, made in the usual way by deep drawing relatively thin sheet steel. A pair of sleeve-like inner threaded members 26 are tightly secured to the front housing part 20, such as by flanging, with a sealing ring positioned in between, if desired. In similar fashion, a pair of sleeve-like rear threaded members 28 are tightly secured to the rear housing part 24. Each one of the inner threaded members 26 is connected by a stiff tube 30 to the corresponding one of the rear threaded members 28, the tube being threaded tightly into an inner thread formed in the rear threaded member 28 and also being tightly secured to the front threaded member 26, such as by welding.

A movable front partition 32, a stationary central partition 33, and a movable rear partition 34 subdivide the interior of the booster 12 into four chambers 40, 42, 44, and 46, while elastic bellows 36 and 38 seal the movable front partition 32 and the movable rear partition 34, respectively, with respect to the tubes 30. Chambers 40 and 44 are in constant communication with each other through a central area of the booster 12 and, furthermore, connected in the usual way (not shown) to a vacuum source, for example, a suction manifold of an internal combustion engine. Also chambers 42 and 46 are connected with each other at all times through the elastic bellows 38, as is customary with brake pressure boosters in tandem arrangement.

A control valve unit 48, likewise of conventional structure, is arranged in the rear zone of the booster 12 to make sure that, in the inoperative condition, the pressure between all the chambers is balanced, whereas, upon operation, the two chambers 40 and 44 will be separated from the two chambers 42 and 46, such that ambient air flow is admitted into the latter, whereby a pressure difference is created at the two movable partitions 32 and 34, generating forwardly directed forces to actuate the master cylinder 14.

A bolt 50 having a head 52, a cylindrical shaft 54, and a rear portion 56 formed with an external thread to be screwed into a respective one of the threaded sleeves 18 is pushed from the front to the rear through each of the inner threaded members 26, the tube 30 contiguous to the same, and the corresponding rear threaded member 28. The head 52—FIG. 1 shows it to be a cylindrical head with a hexagonal recess—rests against the front face 58 of the corresponding inner threaded member 26. As soon as the bolts 50 are tightened, i.e. as their rear threaded portions 56 are screwed firmly into the respective threaded sleeve 18 at the dividing wall 16 of the motor vehicle, whereby the shaft 54 is subjected to tensile stress, corresponding compressive stress prevails in the corresponding tube 30. This is so, regardless of whether the master cylinder 14 is mounted on the dividing wall 16 together with the booster 12 or alone at a later stage, and it is also the case when the master cylinder 14 is exchanged, for instance, because of some damage discovered subsequently.

The actuator unit 10 normally is a unit ready to be installed as a whole in a motor vehicle and, therefore, the master cylinder 14 first is assembled with the brake pressure booster 12. For this reason an outer threaded member 60 each is associated with each of the two sleeve-like inner threaded members 26. The outer threaded member comprises a sleeve-like cylindrical extension 62, a shoulder 64, and a hexgonal end 66 or similar feature to be engaged by a torque transmitting tool. By its respective cylindrical extension 60 each of the two outer threaded members 60 engages in a through hole 68 provided in a flange 70 formed at the master cylinder 14 and is threaded upon the associated inner threaded member 26 until the shoulder 64 firmly abuts against the flange 70. Hereby the flange 70 is clamped against the upper housing part 20. The inner threaded members 26 back up the sheet of the front housing part 20, pressing it against the backside of the flange 70 so that the otherwise customary reinforcing inlay in the front housing part 20 can be dispensed with.

In the case of the embodiment illustrated in FIG. 1 the bolts 50 can be pushed into the tubes 30 either before or after assembly of the booster 12 with the master cylinder 14. In any case, they remain in position if the master cylinder 14 needs to be exchanged upon mounting of the actuator unit 10 on the dividing wall 16. The inner diameter of the outer threaded members 60 is slightly bigger than the outer diameter of the head 52 of the corresponding bolt 50. For this reason each one of the outer threaded members 60 can be unscrewed from the corresponding inner threaded member 26 and pulled off over the head 52 of the respective bolt 50, thus releasing the flange 70 so that also the master cylinder 14 can be pulled off.

The actuator unit 10 according to FIG. 2 differs from the one shown in FIG. 1 above all in that the tubes 30 are left out and the bolts 50 have taken over their function as spacers. To this end, a cover 72 is screwed into each of the outer threaded members 60 in such manner that the head 52 of the respective bolt 50 is firmly clamped between this cover and the front face 58 of the inner threaded member 26. Furthermore, each bolt 50 is formed with a rear stop 74 to be engaged by a support ring 76 which is fastened to the rear housing part 24 and through which extends the rear portion 56 of the bolt 50. According to FIG. 2, the rear stop 74 is an adjustment nut screwed on the rear portion 56 and locked in place, for instance, by calking or a retaining varnish once the adjustment has been accomplished.

The bolts 50 are prevented from slipping to the front out of the support rings 76 before the cover 72 is mounted in that they each carry a locking element 78 on their shafts 54. In the case of FIG. 2 this is embodied by a sleeve which is slipped on the shaft and will abut against the bellows 36 upon limited forward displacement of the corresponding bolt.

According to FIG. 3, each of the bolts 50 can be formed integrally with a rear stop 74. If adjustment should be required a more or less thick sealing ring could be positioned between the stop 74 and the corresponding support ring 76. In any case, it is important that each of the rear stops 74 acts sealingly against the corresponding support ring 76. That is why it is convenient to dispose a sealing ring in between. As shown in FIG. 3, each bolt 50 also is formed integrally with its respective locking element 78.

What is claimed is:

1. An actuator unit (10) for motor vehicle brakes, comprising
    a brake pressure booster (12) which comprises front and rear housing parts (20, 24) and includes at least one movable partition (32, 34) at which differential pressure can be generated,
    a master cylinder (14) which includes a flange (70) fastened to the front housing part (20) and having at least one through hole (68), and
    at least one bolt (50) which comprises a shaft (54) extending through the hole (68) in the flange (70) and through the two housing parts (20, 24) as well as the movable partition (32, 34) of the booster (12), a head (52) disposed in front of the front housing part (20), and a threaded portion (56) projecting out of the rear housing part (24) and adapted to be screwed into a stationary thread presented in a dividing wall (16) of a motor vehicle, characterized in that
    a hollow, inner threaded member (26) having a front face (58) is fastened to the front housing part (20),
    the shaft (54) of the bolt (50) passes through the inner threaded member (26) and the head (52) of the bolt rests on the front face (58) thereof,
    the flange (70) is clamped between the inner threaded member (26) and a hollow, outer threaded member (60) whose inner diameter is greater than the outer diameter of the head (52) of the bolt (50), and
    the outer threaded member (60) includes a sleeve-like extension (62) which engages in the hole (68) formed in the flange (70) and is screw connected to the inner threaded member (26).

2. The actuator unit as claimed in claim 1, characterized in that the head (52) of the bolt (50) is disposed at least partly within the outer threaded member (26).

3. The actuator unit as claimed in claim 2, characterized in that the head (52) of the bolt (50) is clamped between the inner threaded member (26) and a cover (72) which is screw connected to the outer threaded member (60).

4. The actuator unit as claimed in claim 3, characterized in that the bolt (50) includes a rear stop (74) by which it rests on the rear housing part (24).

5. The actuator unit as claimed in claim 4, characterized in that the rear stop (74) is screwed like a nut on the rear portion (56) of the bolt (50) and is disposed inside the booster (12) and locked against rotation.

6. The actuator unit as claimed in any one of claims 3 to 5, characterized in that the bolt (50) is connected to a retention element (78) which is arranged inside the booster (12) and prevents the bolt from falling out to the front prior to being threaded into the dividing wall (16) of the motor vehicle.

7. The actuator unit as claimed in claim 1 or 2, characterized in that the bolt (50) extends through a tube (30) disposed within the booster (12) and maintaining a predetermined distance between the front and rear housing parts (20, 24).

8. The actuator as claimed in claim 7, characterized in that the tube (30) is screw connected to a rear threaded member (28) which is fastened to the rear housing part (24).

* * * * *